United States Patent
Zhang et al.

(10) Patent No.: US 10,311,166 B2
(45) Date of Patent: Jun. 4, 2019

(54) SYSTEM AND METHOD FOR SOLVING AND ENFORCING ASSOCIATIVE CONSTRAINTS

(71) Applicant: Siemens Product Lifecycle Management Software Inc., Plano, TX (US)

(72) Inventors: Zhi Zhang, Manhattan, KS (US); Arquimedes Martinez Canedo, Plainsboro, NJ (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 360 days.

(21) Appl. No.: 15/251,434

(22) Filed: Aug. 30, 2016

(65) Prior Publication Data
US 2017/0255713 A1   Sep. 7, 2017

Related U.S. Application Data

(60) Provisional application No. 62/302,877, filed on Mar. 3, 2016.

(51) Int. Cl.
*G06F 17/50* (2006.01)

(52) U.S. Cl.
CPC .......... *G06F 17/50* (2013.01); *G06F 2217/02* (2013.01); *G06F 2217/06* (2013.01)

(58) Field of Classification Search
None
See application file for complete search history.

(56) References Cited

U.S. PATENT DOCUMENTS

2014/0019112 A1* 1/2014 Canedo et al.
2015/0025854 A1* 1/2015 Arquimedes et al.
(Continued)

OTHER PUBLICATIONS

Biahmou Alain et al: "An Approach for Efficient Interoperability in Mechatronics Product Development"; NAFEMS Seminar: "Multi-Disciplinary Simulations—The Future of Virtual Product Development"; XP055391895; / Oct. 11, 2009, 11 pages.
(Continued)

*Primary Examiner* — Syed A Roni (57) ABSTRACT

A system and method is provided that facilitates solving and enforcing associative constraints across heterogeneous models of the same system. The system may include a processor configured to: access an expression that specifies a relationship between at least one first constraint variable and at least one second constraint variable; access a first constraint map that maps at least one first model property of a first model to the at least one first constraint variable; and access a second constraint map that maps at least one second model property of a second model to the at least one second constraint variable. The processor may also be configured to: retrieve based on the first constraint map, at least one first model value of the at least one first model property from the first model by accessing a first modeling software component that is configured to access and manipulate the first model; and determine at least one second model value for the at least one second model property of the second model, based on the at least one first model value, the expression, the first constraint map, and the second constraint map.

15 Claims, 7 Drawing Sheets

(56) References Cited

U.S. PATENT DOCUMENTS

2015/0032420 A1* 1/2015 Tristano et al.
2016/0246908 A1* 8/2016 Komzsik
2017/0039298 A1* 2/2017 Das et al.

OTHER PUBLICATIONS

Arquimedes Canedo et al: "Maintaining the Design Intent in the Synthesis of 3-D and 1-D System Models Using Constraints"; IEEE Systems Journal; XP055390305; US; ISSN: 1932-8184; DOI:10.1109/JSYST.2016.2596242, 10 pages.
Chahe Adourian et al: "Consistency Between Geometric and Dynamic Views of a Mechanical System"; XP058325700; ISBN: 978-1-56555-316-3, 6 pages, Jan. 2017.
Chahe Adourian et al: "Bidirectional Integration of Geometric and Dynamic Simulation Tools"; XP055391976, 185 pages, 2011.
Klaas Jan De Kraker et al: "Maintaining Multiple Views in Feature Modeling", ACM, 2 Penn Plaza, Suite 101—New York USA, XP040092136, May 14, 1997, 8 pages.
EP Search Report dated Aug. 16, 2017, for EP Application No. 17157218.3, 19 pages.

\* cited by examiner

SYSTEM AND METHOD FOR SOLVING AND ENFORCING ASSOCIATIVE CONSTRAINTS

CROSS REFERENCE TO RELATED APPLICATIONS

This application claims benefit of U.S. Provisional Application No. 62/302,877 filed on Mar. 3, 2016, which application is hereby incorporated herein by reference in its entirety.

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to mange models of products. Such product systems may benefit from improvements.

SUMMARY

Variously disclosed embodiments include data processing systems and methods that may be used to facilitate solving and enforcing associative constraints across heterogeneous models of the same system. In one example, a system may comprise at least one processor configured to access an expression that specifies a relationship between at least one first constraint variable and at least one second constraint variable. The processor may also be configured to access a first constraint map that maps at least one first model property of a first model to the at least one first constraint variable. The processor may also be configured to access a second constraint mapthat maps at least one second model property of a second model to the at least one second constraint variable. In addition, the processor may be configured to retrieve based on the first constraint map, at least one first model value of the at least one first model property from the first model by accessing a first modeling software component that is configured to access and manipulate the first model. Also, the processor may be configured to determine at least one second model value for the at least one second model property of the second model, based on the at least one first model value, the expression, the first constraint map, and the second constraint map.

In another example, a method for solving and enforcing associative constraints may comprise through operation of at least one processor several acts. Such acts may include accessing an expression that specifies a relationship between at least one first constraint variable and at least one second constraint variable. Such acts may also include accessing a first constraint map that maps at least one first model property of a first model to the at least one first constraint variable. In addition, such acts may include accessing a second constraint map that maps at least one second model property of a second model to the at least one second constraint variable. Further, such acts may include retrieving based on the first constraint map, at least one first model value of the at least one first model property from the first model by accessing a first modeling software component that is configured to access and manipulate the first model. Also, such acts may include determine at least one second model value for the at least one second model property of the second model, based on the at least one first model value, the expression, the first constraint map, and the second constraint map.

A further example may include a non-transitory computer readable medium encoded with executable instructions (such as a software component on a storage device) that when executed, causes at least one processor to carry out this described method.

Another example may include an apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Various technologies that pertain to systems and methods that facilitate solving and enforcing associative constraints will now be described with reference to the drawings, where like reference numerals represent like elements throughout.

The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
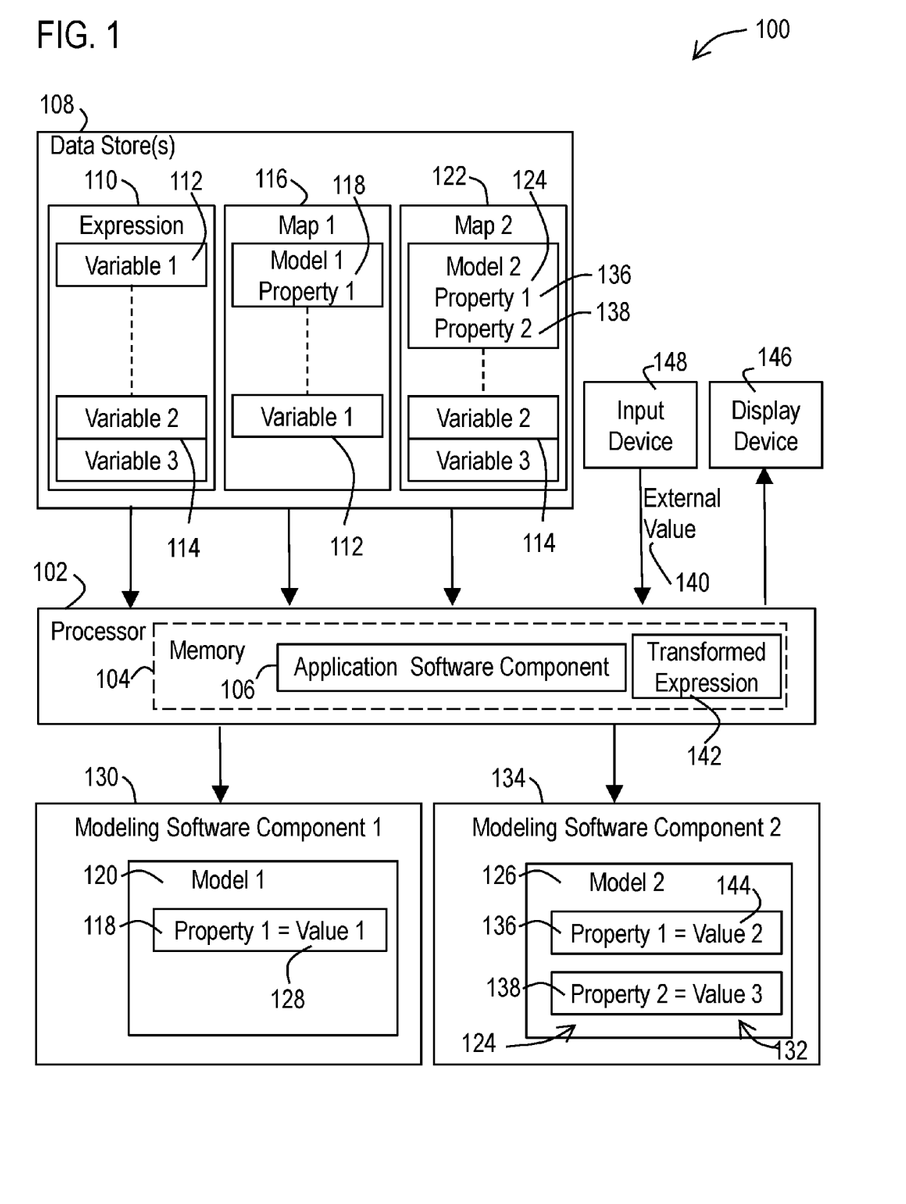
FIG. 1 illustrates a functional block diagram of an example system that facilitates solving and enforcing associative constraints.

With reference to FIG. 1, an example data processing system 100 is illustrated that facilitates solving and enforcing associative constraints across heterogeneous models of the same system. The system 100 may include at least one processor 102 that is configured to execute at least one application software component 106 from a memory 104 accessed by the processor. The application software component may be configured (i.e., programmed) to cause the processor to carry out various acts and functions described herein. For example, the described application software component 106 may include and/or correspond to one or more components of a PLM software application that is configured to retrieve, generate, and store product data in a data store 108 such as a database (e.g., Oracle, Microsoft SQL Server), file system, hard drive, SSD, memory card and/or any other type of device or system that stores non-volatile data.

Examples of PLM software applications that may be adapted to carry out the features and functions described herein may include a simulation and analysis tool such as Siemens LMS Imagine.Lab Amesim and/or System Synthesis, as well as the NX suite of applications and/or Solid Edge Simulation software produced by Siemens Product Lifecycle Management Software Inc., of Plano, Tex., US. However, it should be appreciated that the systems and methods described herein may be used in other product systems (e.g., a modeling software) and/or any other type of system that generates and stores product data in a database or that manipulates models in a workspace.

The described system may include at least one display device 146 (such as a display screen) and at least one input device 148. For example, the processor may be included as part of a PC, notebook computer, workstation, server, tablet, mobile phone, or any other type of computing system, or any combination thereof. The display device, for example, may include an LCD display, monitor, and/or a projector. The input devices, for example, may include a mouse, pointer, touch screen, touch pad, drawing tablet, track ball, buttons, keypad, keyboard, game controller, camera, motion sensing device that captures motion gestures, or any other type of input device capable of providing the inputs described herein. Also, for devices such as a tablet, the processor 102 may be integrated into a housing that includes a touch screen that serves as both an input and display device. Further, it should be appreciated that some input devices (such as a game controller) may include a plurality of different types of input devices (analog stick, d-pad, and buttons).

Maintaining consistency between the parameters of two models that represent the same system is challenging. In an example, software such as Amesim (e.g., CAD2AME) may be configured to allow for non-associative parameterization between three dimensional (3D) and one dimensional (1D) models. However, changes in one model may propagate in only one direction, and changes in the other are not reflected back to the original model. The example system 100 may be configured to enable changes between different types of models to be propagated to the other one of these models through operation of the at least one processor 102.

For example, the application software component 106 may be operative to access a first model 120 (e.g., a 1D simulation model) via a suitable API of a first modeling software component 130 (e.g., a simulation tool such as Amesim). Also, in this example, the application software component 106 may be operative to access a second model 126 (e.g., a 3D CAD model) via a suitable API of a second modeling software component 134 (e.g., a 3D CAD tool such as NX).

Figure 2:
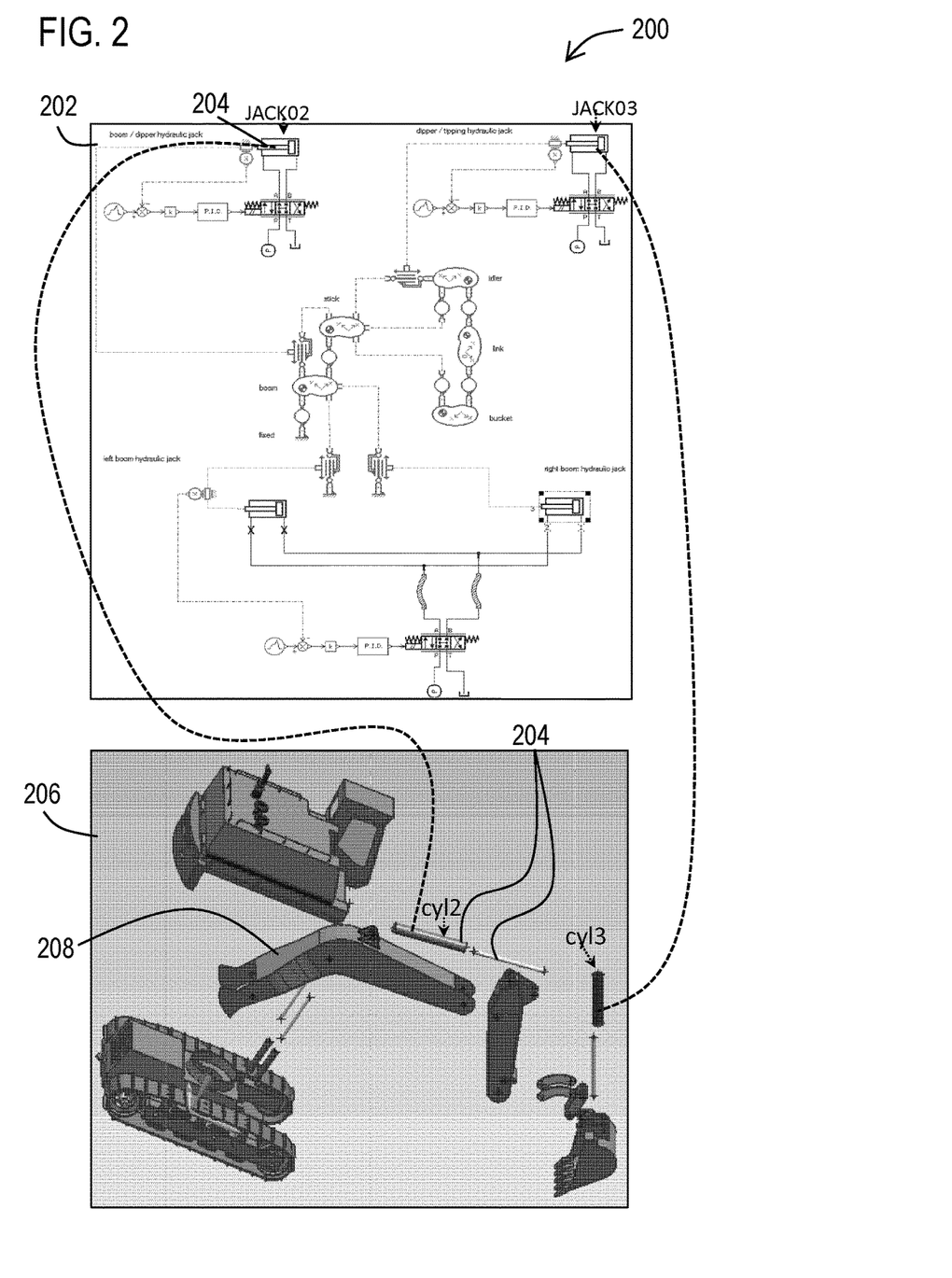
FIG. 2 illustrates an example of different types of models including a simulation model and a CAD model.

FIG. 2 illustrates an example 200 of such different types of models including a 1D simulation model 202 that involves the simulation of at least one hydraulic cylinder 204 ("JACK02"). FIG. 2 also illustrates an example of a 3D CAD model 206 in which a portion includes a 3D model for the same hydraulic cylinder 204 ("cyl2").

In this example both 1D simulation model 202 and the 3D CAD model 206 may be modeling a machine such as a lifting arm 208 of an excavator that includes this hydraulic cylinder 204. The 1D simulation model 202 may specify nonlinear time-dependent analytical equations that represent the system's hydraulic behavior including the operation of the hydraulic cylinder 204. The 3D CAD model 206 may specify the shape, dimensions, and materials of parts that in combination produce a physical embodiment of the hydraulic cylinder 204.

Each of these models may include properties that are and are not relevant to the other model. For example, the 1D simulation may specify functional information such as hydraulic pressure levels applied to the hydraulic cylinder, which information is not modeled in the 3D CAD model. Similarly, the 3D CAD model may specify a type of material used to manufacture the rod of the hydraulic cylinder, which information may not be relevant to the 1D simulation.

Figure 3:
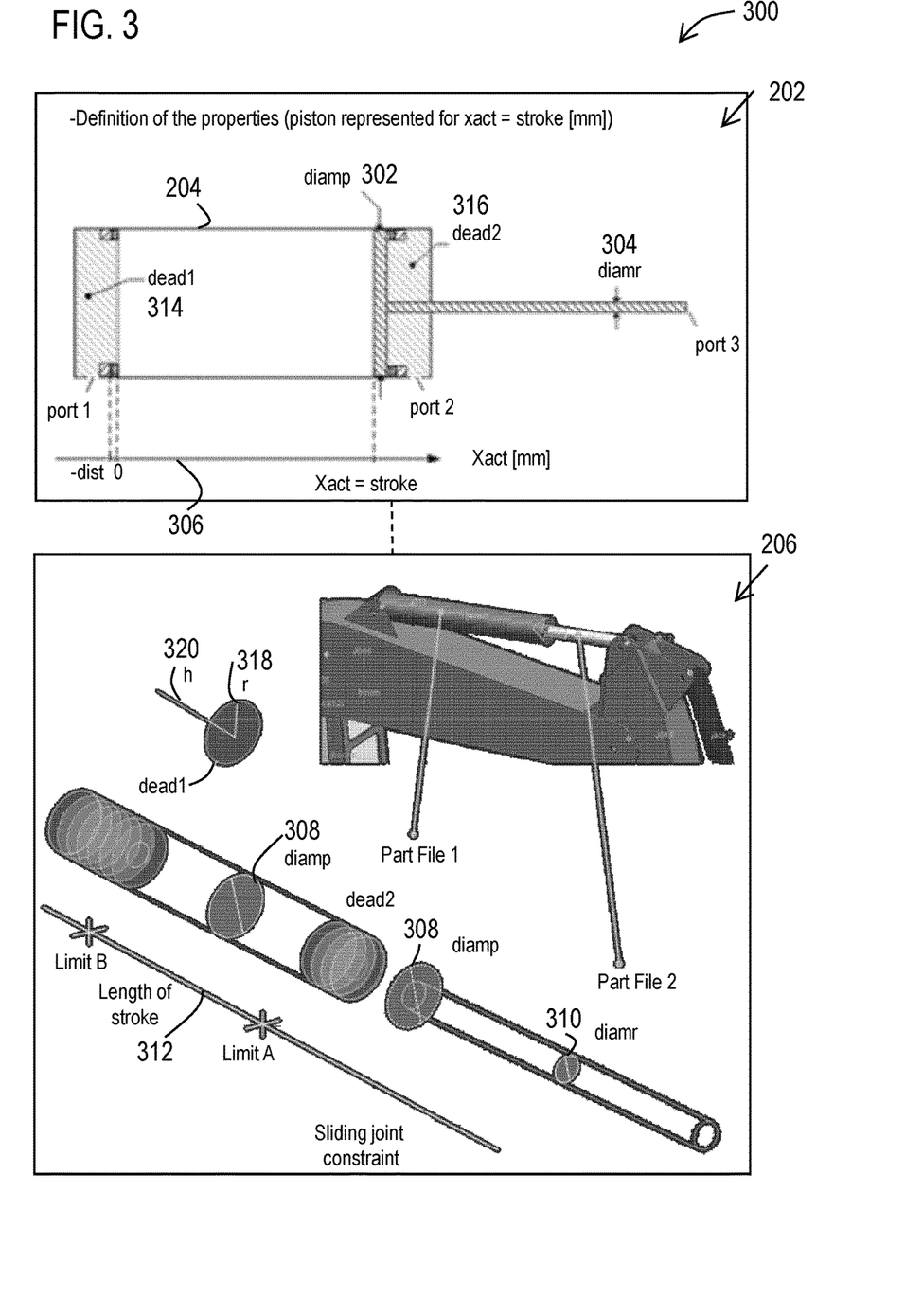
FIG. 3 illustrates example correlations between properties of the simulation model and the CAD model.

Each of these models may also include properties that are directly correlatable between the models. For example, FIG. 3 illustrates example correlations 300 between properties of the 1D simulation model 202 and the 3D CAD model 206. For example, the 1D simulation of the hydraulic cylinder 204 may include parameters for piston diameter 302, rod diameter 304, and length of stroke 306. Such parameters may also be encoded in the CAD model and, for example, may be specified as a product interface using existing CAD primitives such as lines, points. For example, the piston diameter may be associated with a "diamp" CAD feature 308, the rod diameter may be associated with a "diamr" CAD feature 310, and the length of stroke may be associated with a distance 312 between a "Limit B" and "Limit A" of a sliding joint constraint in the CAD model. It should be noted that a simple CAD line could also be used, instead of the sliding joint constraint, to create the length of stroke product interface in the CAD model. Similarly, the "diamp" CAD feature could be defined either in a Part File 1, or Part File 2.

However, the dead volume property 314 at the port 1 end and the dead volume property 316 at the port 2 end of the hydraulic cylinder 204 in the 1D simulation model 202, on the other hand, cannot be directly specified with existing CAD features in this example. Thus a dead volume calculation may be carried out by the described system in order to link such 1D properties to relevant properties in the 3D CAD model. For complex geometry (not the case in this example), the dead volume calculation carried out by the described system may require special algorithms implemented as scripts in the CAD system. However, in this simple example, the rods of the hydraulic cylinder 204 in the CAD model 206 are simple cylinders. Under this assumption, the architect (that configures the system as described in more detail below) can decide that the dead volume 314 and/or 316 is calculated as the volume (v) of a cylinder with an equation such as: $v=\pi r^2 h$, where r is the radius 318, and h is the height 320 of the cylinder in the CAD model. Both r and h can be represented by CAD features.

To carry out linking the different types of properties between the 1D and 3D models, the application software component 106 may include a constraint solver that is configured to access/update values for these different properties in the 1D and 3D models. Alternatively, the user can provide a tool-specific script as part of the application software component which is configured to compute the values of the properties.

For example, with reference to FIG. 1, the system may be configured (via the application software component 106) to access a constraint expression 110 that specifies a relationship between at least one first constraint variable 112 and at least one second constraint variable 114. The expression may be used to translate data from one model to another type of model.

Figure 4:
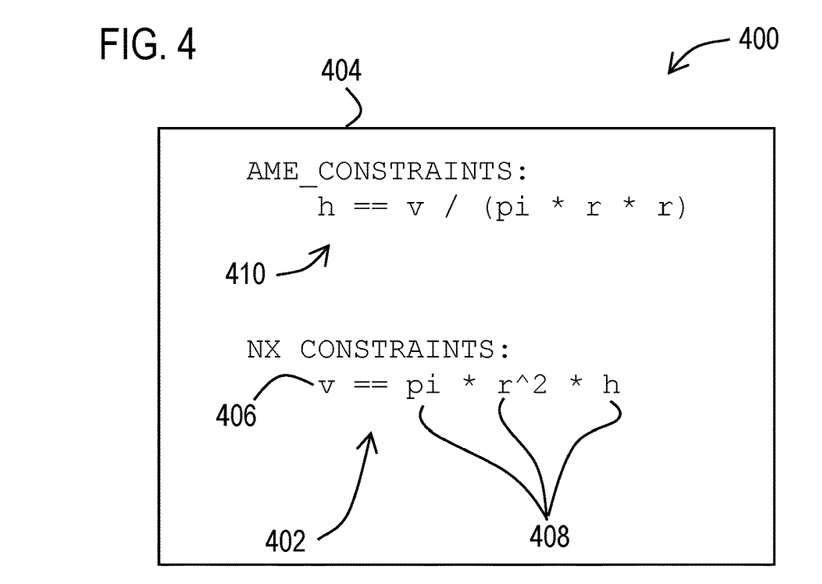
FIG. 4 illustrates an example of an expression stored in a constraints data file/record.

FIG. 4 illustrates an example 400 of an expression 402 stored in a constraints data file/record 404, which is in the form of an equation. The equation may specify a first constraint variable 406 (on a first side of the "=" equality symbols) such as a variable for a quantity such as volume (v) for the previously described dead volume of a hydraulic cylinder in the 1D simulation model. The equation may also specify a plurality of second constraint variables 408 (on a second side of the "=" equality symbols) such as variables for quantities such as such it (pi), radius (r), and height (h), which via a mathematical formula ($\pi r^2 h$) specified by the expression 400 equal a value for the first constraint variable (v) 406.

Referring back to FIG. 1, the constraint variables 112, 114 of the expression may have corresponding relationships to model properties 118, 124. For example, the at least one first constraint variable 112 (e.g., volume v) may correspond to at least one first model property 118 of a first model 120 (e.g., the 1D simulation model) that is manipulated using a first modeling software component 130 (e.g., a simulation tool such as Amesim). Also, in this example, the at least one second constraint variable 114 (e.g., radius r and height h) may correspond to at least one second model property 124 of a second model 126 (e.g., the 3D CAD model) that is manipulated using a second modeling software component 134 (e.g., a 3D CAD tool such as NX).

To determine these relationships, the described system may be configured (via the application software component 106) to access a plurality of constraint maps 116, 122 that specify relationships between model properties 118, 124 in each model and the relevant constraint variables 112, 114 in the described expression 110. For example, the system may be configured to access a first constraint map 116 that maps at least one first model property 118 of a first model 120 to the at least one first constraint variable 112. In addition the system may be configured to access a second constraint map 122 that maps at least one second model property 124 of a second model 126 to the at least one second constraint variable 114.

In this described example, such an expression 110 and constraint maps 116, 122 may be stored as data in one or more data files/records included in one or more data stores 108 (e.g., data base or file system). For example, the described expression and constraint maps may be stored as data in a text file/record with a structure such as XML and/or a modeling language such as the heterogeneous architecture description language (HADL) (illustrated in FIG. 4), or any other format that is capable of being generated by a human and read by the processor 102.

Figure 5:
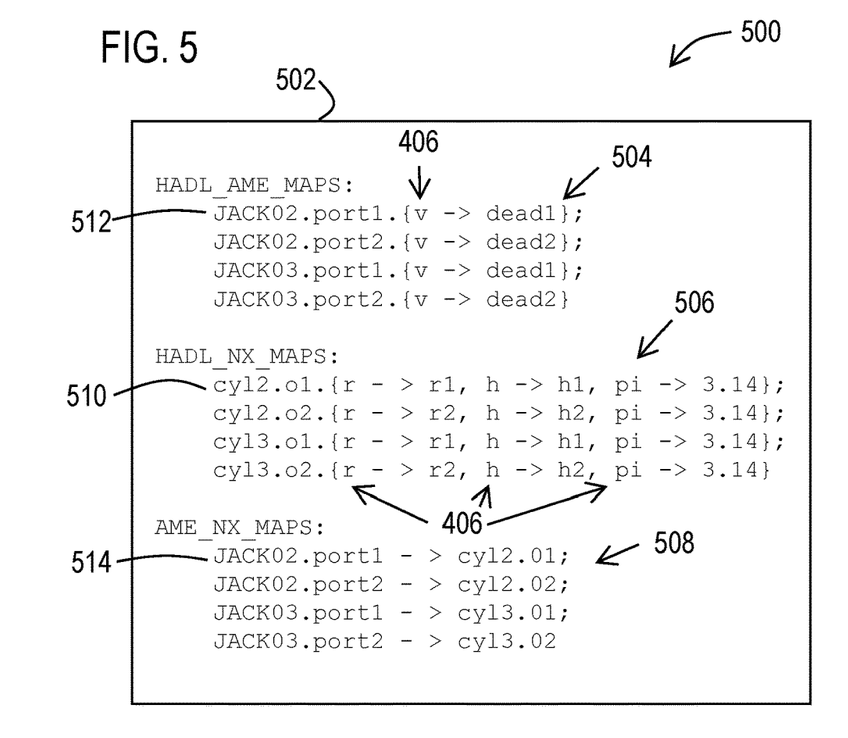
FIG. 5 illustrates an example of a map data file/record that includes examples of several sets of constraint maps respectively for each of the simulation model and the CAD model.

FIG. 5 illustrates an example 500 of a map data file/record 502 written in HADL that includes examples of several sets of constraint maps 504, 506 respectively for each of the models described previously with respect to a hydraulic cylinder. Each of these constraint maps includes the names of the callable properties that are accessible via API call to each respective model using these names.

It should be noted that the described system and modeling language are capable of mapping a single constraint expression to more than once instance of a component (or portion thereof) in the models. For example, an excavator may have two instances of the hydraulic cylinder, each having two ports that can be constrained using a common constraint expression.

To assist in this described process, the 3D CAD models (such as created with NX software) may be formed as parametric models, so that the described system can leverage the properties in these parametric models to map constraint variables to CAD properties. Similarly, 1D simulation models such as with Amesim models may already be parametric, thus making it straightforward to map constraint variables to Amesim component properties.

Figure 6:
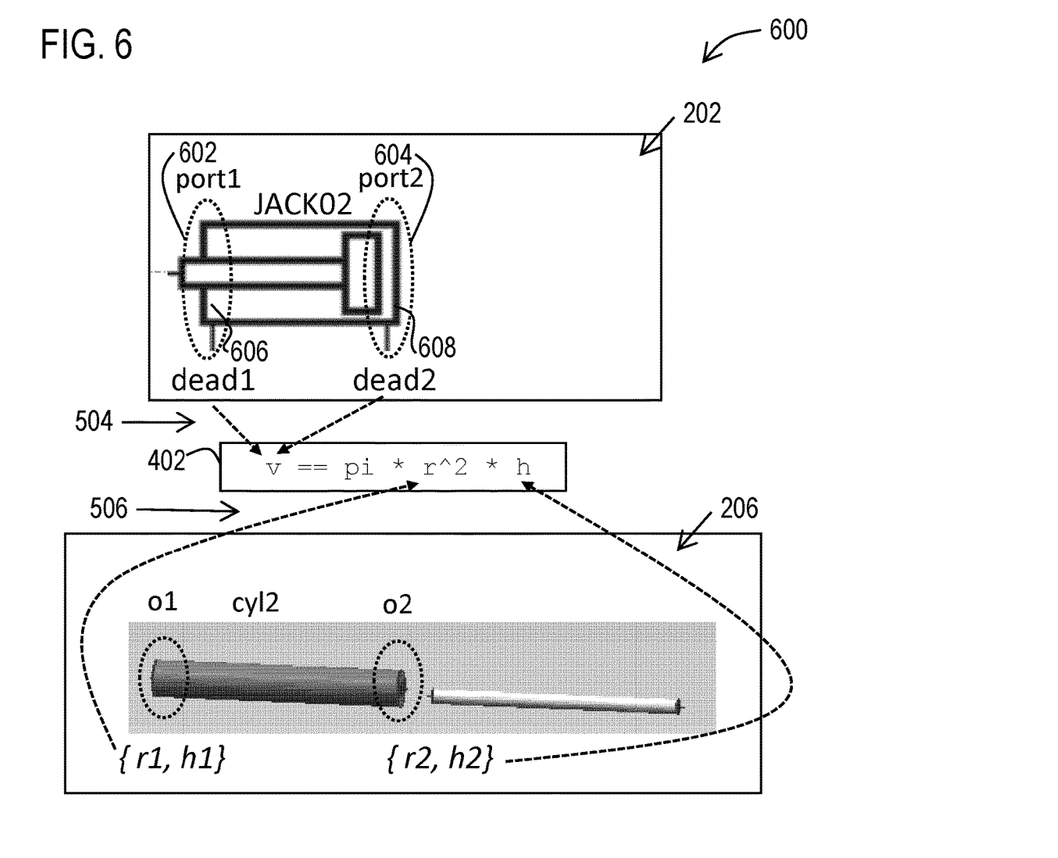
FIG. 6 illustrates an example of property names for the simulation model 202 the CAD model that are mapped to constraint variables in the expression.

FIG. 6 schematically illustrates an example 600 of these property names for the previously described 1D simulation model 202 and the 3D CAD model 206 that are mapped to constraint variables (via the constraint maps 504, 506) in the expression 402. For example, as illustrated in FIG. 2, the 1D simulation model 202 may include several hydraulic cylinders with user defined names such as "JACK02" and "JACK03". Likewise, the 3D CAD model 206 may include several corresponding hydraulic cylinders with user defined names such as "cly2" and "cyl3". FIG. 6 illustrates an example mapping for the JACK02 and cly2 hydraulic cylinders. In this example, the "JACK02" hydraulic cylinder may have two ports, "port1" 602 and "port2" 604. These ports may have two respective properties called "dead1" 606 and "dead2" 608, which correspond to the volume v constraint variable in the expression 402. Similarly, the "cly2" hydraulic cylinder may have two ports "o1" and "o2", but with two different properties {"r1", "h1"} and {"r2", "h2"}, corresponding to the radius r and height h constraint variables in the expression 402. It should be understood that the port names: port1, port2, o1, and o2, are unique identifiers that distinguish different instances of features within the same component so as to avoid ambiguity of the associated constraints between two models.

Referring back to FIG. 5, the previously described map data file/record 502 may specify constraint maps 504, 506 for each of the different combinations of different hydraulic cylinders and associated ports in the models (e.g., for JACK02, JACK03, port1, port2, cyl2, cyl3, o1, o2). For example, the section label: "HADL_AME_MAPS" may include a set of constraint maps 504 that map constraint variables from the expression 402 and component instances in the 1D simulation model (e.g., in the Amesim modeling software). These constraint maps can be interpreted as follows: the JACK02 hydraulic cylinder has port1 and port2, which have volume properties dead1 and dead2 separately that are mapped to the volume v constraint variable 406 in the expression 402. The constraint maps are similar for the hydraulic cylinder JACK03.

Also in this example, the section label: "HADL_NX_MAPS" may include a set of constraint maps 506 that map constraint variables from the expression 402 and component instances in the 3D CAD model (e.g., in the NX modeling software). These constraint maps can be interpreted as follows: the cyl2 hydraulic cylinder has ports o1 and o2, which each have a radius property r1, a height property h1, with pi being a constant 3.14, that are mapped to the constraint variables 408 r, h, and pi in the expression 402. The constraint maps are similar for the hydraulic cylinder cyl2.

To facilitate correlations between corresponding instances and ports across multiple models, the map data file/record 502 may also include a section label (such as "AME_NX_MAPS") that provides one or more port maps 508 that define relationships between ports of corresponding instances between the two models. In this example, the port maps define relationships between JACK02 and cyl2 hydraulic cylinders, where port port1 is related to port of and port port2 is related to port o2 (as well as the corresponding relationships between JACK03 and cyl3).

Referring back to FIG. 1, the described application software component 106 may carry out several steps/functions using the defined constraint maps 116, 122 and expression 110 (and optional port maps) in order to link the two models. Such a link enables the application software component to modify one model based on changes to the other model, and vice versa.

For example, the at least one processor 102 may be configured (via the application software component) to retrieve based on the first constraint map 116, at least one first model value 128 of the at least one first model property 118 from the first model 120 by accessing the first modeling software component 130 that is configured to access and manipulate the first model. The processor 102 may then (via the application software component) determine at least one second model value 132 for the at least one second model property 124 of the second model 126, based on the at least one first model value 128, the expression 110, the first constraint map 116, and the second constraint map 122. In addition, the processor 102 may then (via the application software component) cause the second modeling software component 134 that is configured to access and manipulate the second model 126, to update the at least one second model property 124 in the second model to have the determined at least one second model value 132.

Thus for example, a designer may make a change to the 3D CAD model (such as a change to the values for the radius and/or height properties of a hydraulic cylinder), execute the described application software component, and cause thereby the 1D simulation model to be updated to have a different value for the dead volumes of the corresponding hydraulic cylinder.

However, it should be understood that updating the models in the opposite manner (from the 1D simulation model to the 3D CAD model) may include additional functionality to handle the circumstance (in this example) that the number of constraint variables in the constraint expression for the 3D CAD model (e.g., two constraints: r and h) is larger than the number of constraint variables for the 1D simulation model (e.g., one constraint: v).

Since the volume constraint is computed using two CAD properties (r1 and h1), there are multiple possible new parameterizations for r1 and h1 that satisfy a new volume constraint. Therefore, the application software component may be configured to access an input from the designer that specifies which of the two (or more) properties in the model being updated has higher priority and/or which of the two (or more) properties are locked.

For example, the at least one processor 102 may be configured to determine that the second constraint map 122 specifies a plurality of second model properties 136, 138 (such as h1 and r1) of the second model that are more properties than the at least one first model property 118 (such as dead1) of the first model specified by the first constraint map 116. Based on this determination, the at least one processor may be configured to determine a transformed expression 142 (such as $h=v/(\pi r^2)$) that is usable to determine a constraint variable (e.g., h) for one of the two second model properties 136 (e.g., h1). The processor may also determine an external value 140 corresponding to the other of the second model properties 138 (e.g., r1). Such an external value may not be included in the first constraint map, the second constraint map, the expression, and the first model. Rather the external value 140 for at least one of the second model properties 138 may be determined from an input from a user and/or from the second model itself. The processor may then determine the at least one second model value 144 for the at least one of the second model properties 136 (e.g., h1) of the second model 126, based on the at least one first model value 128, the transformed expression 142, and the external value 140.

In an example embodiment, the previously described constraints data file/record 404 shown in FIG. 4 may include the transformed expression 410. However, in an alternative embodiment the processor may be configured to determine (via a math module) the transformed expression 142, 410 from the original expression 402 accessed from the constraints data file/record 404.

In this described example, the at least one processor may be configured to provide an output through the display device 146 that prompts a user to provide an input through the at least one input device 148 that is usable for the at least one processor to determine the external value. For example, the output provided through the display device 146 may request the user to indicate which of the plurality of second model properties should be locked (e.g., remain unchanged). Based on a selection of one of the second model properties to lock, the processor may access the second model (via an API call to the second modeling software component 134) and retrieve the current value (which corresponds to the described external value) for the second model properties that was selected to be locked. The processor may then determine the non-locked second model properties as described above using this determined external value.

In another example, the output provided through the display device 146, may request that the user provide the external value directly via an input through an input device. Further, it should be appreciated that the processor may be configured (e.g., via the application software component 106) to provide the user with the option to select a second model property to lock as well as the option to specify a new value (e.g., the described external value) for the selected second model property.

In the examples described previously, a modeling language (such as HADL) may be used to specify constraints of functional properties. The system may then automatically enforce the constraints on its different models (e.g., such as Amesim and NX models) with the previously described application software component 106 that functions as a constraint interpreter/solver and a communication mechanism to reflect the updated information from one model to another. However, it should also be appreciated that the described system may not automatically update the models, but instead check the consistency of the values of properties in the two models (based on the defined constraint expression and maps) and report determined consistency or inconsistency of the models through an output through a display device.

In an example embodiment that uses the HADL modeling language, the expression(s) 402, 410 in the constraints data file/record 404 shown in FIG. 4, may be described by an equation formula in the modeling language with the following formal grammar:

```
structure: expr == expr
    expr := ID | DECIMAL | expr binary_operator expr | unary_operator expr
```

Also, it should be appreciated that this format may be extended to support more complex model properties constraints.

In an example embodiment, the constraint maps 504, 506 in the map data file/record 502 shown in FIG. 5, may have the following formal grammar:

(ID '.')*ID '>' (ID '.')*ID

Here, the word "ID" is an identifier and may denote the model property name from a particular model (e.g., dead1, r1, h1), a constant (such as a decimal for the value of $\pi$), and one or more constraint variables (e.g., v, r, h) in an expression 402, 410 defined in the constraints data file/record. In this example grammar, (ID '.')*represents a prefix with dot '.' as separator and star '.' means it can repeat zero or more than one times.

To interpret the constraints for an expression automatically, the application software component 106 may implement a constraint solver that uses the ANTLR parser generator or other language recognition tool to access and parse expression(s) and constraint maps from the applicable data files/records and store the results in hash maps. The constraints solver may also be configured to collect properties information of both the current working model and its associated model(s), which can be achieved by calling corresponding model APIs for the applicable modeling software component for each model. For example, the Amesim simulation modeling software provides a Python Circuit API to retrieve and update its model information. Also for example, the NX 3D CAD modeling software provides C# NX Open API that is usable to retrieve and update its model information.

In addition, the constraint solver may be configured to evaluate and solve the constraints in the expression(s) according to the model properties information calculated from the models and according to the constraint maps. For the current working model, a constraint is solvable if all of its constraint variables are computable. In the case where the constraints variables are not available in the current working model, then the constraint solver may prompt the user for the missing values and/or retrieve the information from its associated model, as discussed previously.

The following describes an example of the steps carried out with respect to the expressions(s) and constraint maps shown in FIGS. 4 and 5 with respect to 1D simulation modeling software such as Amesim software and with respect to a 3D CAD modeling software such as NX CAD software.

In an NX model, if cylinder cly2 is our current working model instance (e.g., a 3D model of a hydraulic cylinder), to compute the volume v for the space associated with port cyl2.o1 according to the expression $v==pi*r^2*h$, the constraint solver maps pi to 3.14, r to r1 and h to h1 according to the constraint map 510 described in the section HADL_NX_MAPS. The constraint solver then acquires the current values for r1 and h1 from the cly2.o1 port of the NX model, and computes the value for the variable v according to the constraint expression 402.

The resolved value for the constraint variable v can be used for many purposes. For example, the constraint solver may use the computed constraint variable v to check whether the dead1 volume in the Amesim model is consistent with this computed value from the NX model. Such consistency (or not) may be reported to a user via an output through the display device as discussed previously. In addition, the computed value for the constraint variable v may be used to propagate an updated volume from the NX model to the dead1 volume in Amesim model. For example, according to the constraint map 512 described in the section HADL_AME_MAPS and the port map 514 described in the section AME_NX_MAPS, the constraint solver may update the dead1 volume property associated with the port JACK02.port1 of the JACK02 working model instance of the hydraulic cylinder.

In the Amesim model, if JACK02 is the current working model instance, in this example, it is not possible to determine the radius or height for either port1 or port2 according to the constraint expression $v==pi*r^2*h$ with only the properties information of JACK02, as both port1 and port2 only have volume property dead1 or dead2. As a result, the combination of radius and height is innumerous. To make it solvable, the constraint solver may lock one property, (e.g., radius r based on a selection by a user as discussed previously), then the height h can be calculated with the transformed expression $h==v/(pi*r^2)$. For example, to compute a height h with respect to the JACK02.port1 Amesim hydraulic cylinder instance, the constraint solver may map constraint variable v to the property dead1 from the JACK02.port1 hydraulic cylinder instance; and may map constraint variable r to the property r1 from the cly2.o1 NX hydraulic cylinder instance, according to the constraint maps 510, 512 and the translated expression 410 and port map 514.

The constraint solver may then access the value of dead1 and r1 from Amesim and NX models separately, and compute the constraint variable height h according to the translated expression 410. The resolved value for the constraint variable h may be used to check whether the Amesim model and NX model are consistent, and/or may be used to propagate the updates in the Amesim model to the NX model. For example, according to the constraint map 510 described in the section HADL_NX_MAPS, the constraint solver may update the height property h1 associated with the port cyl2.o1 of the cyl2 working model instance (e.g., 3D CAD model of the hydraulic cylinder).

The described system may enable associative properties to be declared as asset interfaces for the described system to query these in their respective tools or PDM modeling systems. In addition, the described system may provide a constraint solver that is agnostic with respect to how a product interface is realized in the tools. Thus the constraint solver may merely need the interface to be a type and computable (e.g., give a name or a number). In addition the described system may enable product interfaces to be visible at the system level and not necessarily at the asset level. This allows for checks on whether the assets comply with a specification, or have redundant information. Further, the described system may have a constraint solver that takes an expression or a user-defined script to calculate a value. Also as described previously, model properties can be subject locked (i.e., classified as non-changeable) by a user so as to calculate updated values for a model that are acceptable to the designer.

Figure 7:
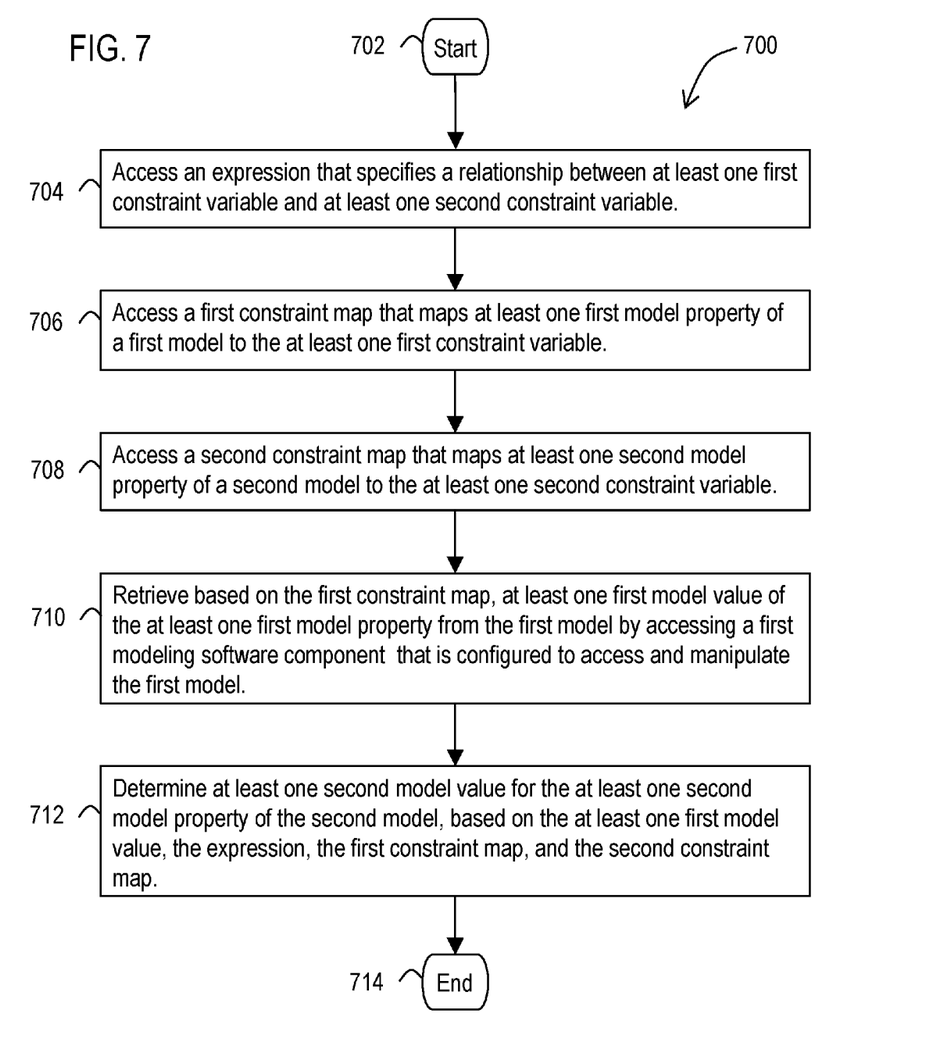
FIG. 7 illustrates a flow diagram of an example methodology that facilitates solving and enforcing associative constraints.

With reference now to FIG. 7, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 7, a methodology 700 is illustrated that facilitates solving and enforcing associative constraints. The methodology may start at 702 and may include several acts carried out through operation of at least one processor.

These acts may include an act 704 of accessing an expression that specifies a relationship between at least one first constraint variable and at least one second constraint variable. These acts may also include an act 706 of accessing a first constraint map that maps at least one first model property of a first model to the at least one first constraint variable. Further, these acts may include an act 708 of accessing a second constraint map that maps at least one second model property of a second model to the at least one second constraint variable. Also these acts may include an act 710 of retrieving based on the first constraint map, at least one first model value of the at least one first model property from the first model by accessing a first modeling software component that is configured to access and manipulate the first model. In addition, these acts may include an act 712 of determining at least one second model value for the at least one second model property of the second model, based on the at least one first model value, the expression, the first constraint map, and the second constraint map. At 714 the methodology may end.

It should be appreciated that the methodology 700 may include other acts and features discussed previously with respect to the data processing system 100. For example, the methodology may include an act of causing a second modeling software component that is configured to access and manipulate the second model, to update the at least one second model property in the second model to have the determined at least one second model value.

The example methodology 700 may also include further acts carried out through operation of the at least one processor including: retrieving based on the second constraint map, at least one second model value of the at least one second model property from the second model by accessing the first modeling software component that is configured to access and manipulate the second model; determining whether there is consistency between the determined at least one second model value and the retrieved at least one second model value; and causing at least one display device to output indicia indicative of the determination with respect to consistency between the determined at least one second model value and the retrieved at least one second model value.

In this described methodology the expression may correspond to a first expression, and the acts carried out may further include through operation of the at least one processor: determining that the second constraint map specifies a plurality of second model properties of the second model that are more properties than the at least one first model property of the first model specified by the first constraint map. Based thereon on this determination, the methodology may include: determining an external value for at least one of the second model properties based at least in part on further data that is not provided in the first constraint map, the second constraint map, the expression, and the first model; determining a second expression; and determining at least one second model value for at least one of the second model properties of the second model, based on the at least one first model value, the transformed expression, and the external value. In addition, the methodology may include causing the second modeling software component to update the at least one second model property in the second model to have the determined at least one second model value based on the at least one first model value, the transformed expression, and the external value. In some example embodiment, the described methodology may include through operation of the at least one processor, transforming the first expression into the second expression.

Example embodiments of the methodology 700 may also include through operation of the at least one processor: providing an output through a display device that prompts a user to provide an input through at least one input device 148 that is usable for the at least one processor to determine at least one of the second properties that the user has selected to remain unchanged; and retrieving the external value for of the at least one of the second properties that the user has selected to remain unchanged from the second model by accessing the second modeling software component.

As discussed previously, in some examples the described first model may be a one dimensional (1D) simulation of a component and the second model may be a three dimensional (3D) computer-aided-design (CAD) model. However, it should be appreciated that in alternative embodiments, the type of models may be reversed and/or alternative and/or additional types of models may be used.

As discussed previously, acts associated with these methodologies (other than any described manual acts) may be carried out by one or more processors. Such processor(s) may be included in one or more data processing systems, for example, that execute software components (such as the described application software component) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 8:
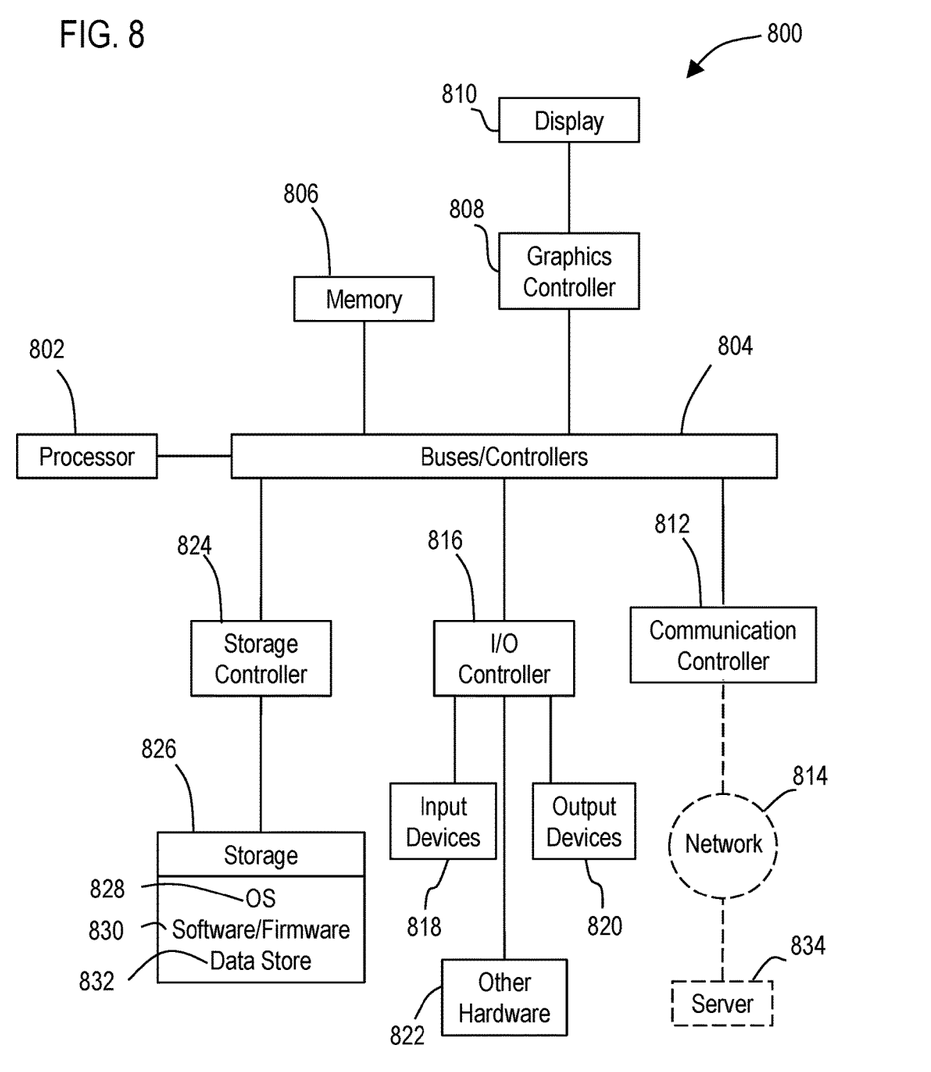
FIG. 8 illustrates a block diagram of a data processing system in which an embodiment may be implemented.

FIG. 8 illustrates a block diagram of a data processing system 800 (also referred to as a computer system) in which an embodiment can be implemented, for example, as a portion of a product system, and/or other system operatively configured by software or otherwise to perform the processes as described herein. The data processing system depicted includes at least one processor 802 (e.g., a CPU) that may be connected to one or more bridges/controllers/buses 804 (e.g., a north bridge, a south bridge). One of the buses 804, for example, may include one or more I/O buses such as a PCI Express bus. Also connected to various buses in the depicted example may include a main memory 806 (RAM) and a graphics controller 808. The graphics controller 808 may be connected to one or more display devices 810. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 812 (Ethernet controllers, WiFi controllers, cellular controllers) operative to connect to a local area network (LAN), Wide Area Network (WAN), a cellular network, and/or other wired or wireless networks 814 or communication equipment.

Further components connected to various busses may include one or more I/O controllers 816 such as USB controllers, Bluetooth controllers, and/or dedicated audio controllers (connected to speakers and/or microphones). It should also be appreciated that various peripherals may be connected to the I/O controller(s) (via various ports and connections) including input devices 818 (e.g., keyboard, mouse, pointer, touch screen, touch pad, drawing tablet, trackball, buttons, keypad, game controller, gamepad, camera, microphone, scanners, motion sensing devices that capture motion gestures), output devices 820 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 802 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 822 connected to the I/O controllers 816 may include any type of device, machine, or component that is configured to communicate with a data processing system.

Additional components connected to various busses may include one or more storage controllers 824 (e.g., SATA). A storage controller may be connected to a storage device 826 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 804 such as a PCI Express bus.

A data processing system in accordance with an embodiment of the present disclosure may include an operating system 828, software/firmware 830, and data stores 832 (that may be stored on a storage device 826 and/or the memory 806). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 812 may be connected to the network 814 (not a part of data processing system 800), which can be any public or private data processing system network or combination of networks, as known to those of skill in the art, including the Internet. Data processing system 800 can communicate over the network 814 with one or more other data processing systems such as a server 834 (also not part of the data processing system 800). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 802 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 800 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client device may correspond to a computer running a web browser or thin client application. Inputs from the user may be transmitted from the web browser or thin client application to be evaluated on the server, rendered by the server, and an image (or series of images) sent back to the client computer to be displayed by the web browser or thin client application. Also in some examples, the remote processor described herein may correspond to a combination of a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 800 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for solving and enforcing associative constraints comprising:
at least one processor configured to:
access an expression that specifies a relationship between at least one first constraint variable and at least one second constraint variable;
access a first constraint map that maps at least one first model property of a first model to the at least one first constraint variable;
access a second constraint map that maps at least one second model property of a second model to the at least one second constraint variable;
retrieve based on the first constraint map, at least one first model value of the at least one first model property from the first model by accessing a first modeling software component that is configured to access and manipulate the first model;
determine at least one second model value for the at least one second model property of the second model, based on the at least one first model value, the expression, the first constraint map, and the second constraint map;
retrieve based on the second constraint map, at least one second model value of the at least one second model property from the second model by accessing a second modeling software component that is configured to access and manipulate the second model;
determine whether there is consistency between the determined at least one second model value and the retrieved at least one second model value;
cause at least one display device to output indicia indicative of the determination with respect to consistency between the determined at least one second model value and the retrieved at least one second model value; and
cause the second modeling software component that is configured to access and manipulate the second model, to update the at least one second model property in the second model to have the determined at least one second model value.

2. The system according to claim 1, wherein the expression corresponds to a first expression, wherein the at least one processor is configured to:
determine that the second constraint map specifies a plurality of second model properties of the second model that are more properties than the at least one first model property of the first model specified by the first constraint map, and based thereon:
determine an external value for at least one of the second model properties based at least in part on further data that is not provided in the first constraint map, the second constraint map, the expression, and the first model;
determine a second expression;
determine at least one second model value for at least one of the second model properties of the second model, based on the at least one first model value, the transformed expression, and the external value; and
cause the second modeling software component to update the at least one second model property in the second model to have the determined at least one second model value based on the at least one first model value, the transformed expression, and the external value.

3. The system according to claim 2, wherein the at least one processor is configured to transform the first expression into the second expression.

4. The system according to claim 1, wherein the at least one processor is configured to:
provide an output through a display device that prompts a user to provide an input through at least one input device that is usable for the at least one processor to determine at least one of the second properties that the user has selected to remain unchanged; and
retrieve the external value for of the at least one of the second properties that the user has selected to remain unchanged from the second model by accessing the second modeling software component.

5. The system according to claim 1, wherein the first model is a one dimensional (1D) simulation of a component, wherein the second model is a three dimensional (3D) computer-aided-design (CAD) model.

6. A method for solving and enforcing associative constraints comprising:
through operation of at least one processor:
accessing an expression that specifies a relationship between at least one first constraint variable and at least one second constraint variable;
accessing a first constraint map that maps at least one first model property of a first model to the at least one first constraint variable;
accessing a second constraint map that maps at least one second model property of a second model to the at least one second constraint variable;
retrieving based on the first constraint map, at least one first model value of the at least one first model property from the first model by accessing a first modeling software component that is configured to access and manipulate the first model;
determining at least one second model value for the at least one second model property of the second model, based on the at least one first model value, the expression, the first constraint map, and the second constraint map;
retrieving based on the second constraint map, at least one second model value of the at least one second model property from the second model by accessing a second modeling software component that is configured to access and manipulate the second model;
determining whether there is consistency between the determined at least one second model value and the retrieved at least one second model value;
causing at least one display device to output indicia indicative of the determination with respect to consistency between the determined at least one second model value and the retrieved at least one second model value; and
causing the second modeling software component that is configured to access and manipulate the second model, to update the at least one second model property in the second model to have the determined at least one second model value.

7. The method according to claim 6, wherein the expression corresponds to a first expression, further comprising through operation of the at least one processor:

determining that the second constraint map specifies a plurality of second model properties of the second model that are more properties than the at least one first model property of the first model specified by the first constraint map, and based thereon:
- determining an external value for at least one of the second model properties based at least in part on further data that is not provided in the first constraint map, the second constraint map, the expression, and the first model;
- determining a second expression;
- determining at least one second model value for at least one of the second model properties of the second model, based on the at least one first model value, the transformed expression, and the external value; and
- causing the second modeling software component to update the at least one second model property in the second model to have the determined at least one second model value based on the at least one first model value, the transformed expression, and the external value.

8. The method according to claim 7, further comprising through operation of the at least one processor, transforming the first expression into the second expression.

9. The method according to claim 6, further comprising through operation of the at least one processor:
- providing an output through a display device that prompts a user to provide an input through at least one input device that is usable for the at least one processor to determine at least one of the second properties that the user has selected to remain unchanged; and
- retrieving the external value for of the at least one of the second properties that the user has selected to remain unchanged from the second model by accessing the second modeling software component.

10. The method according to claim 6, wherein the first model is a one dimensional (1D) simulation of a component, wherein the second model is a three dimensional (3D) computer-aided-design (CAD) model.

11. A non-transitory computer readable medium encoded with executable instructions that when executed, cause at least one processor to carry out a method comprising:
- accessing an expression that specifies a relationship between at least one first constraint variable and at least one second constraint variable;
- accessing a first constraint map that maps at least one first model property of a first model to the at least one first constraint variable;
- accessing a second constraint map that maps at least one second model property of a second model to the at least one second constraint variable;
- retrieving based on the first constraint map, at least one first model value of the at least one first model property from the first model by accessing a first modeling software component that is configured to access and manipulate the first model;
- determining at least one second model value for the at least one second model property of the second model, based on the at least one first model value, the expression, the first constraint map, and the second constraint map;
- retrieving based on the second constraint map, at least one second model value of the at least one second model property from the second model by accessing a second modeling software component that is configured to access and manipulate the second model;
- determining whether there is consistency between the determined at least one second model value and the retrieved at least one second model value;
- causing at least one display device to output indicia indicative of the determination with respect to consistency between the determined at least one second model value and the retrieved at least one second model value; and
- causing the second modeling software component that is configured to access and manipulate the second model, to update the at least one second model property in the second model to have the determined at least one second model value.

12. The computer readable medium according to claim 11, wherein the expression corresponds to a first expression, wherein the method further comprises:
- determining that the second constraint map specifies a plurality of second model properties of the second model that are more properties than the at least one first model property of the first model specified by the first constraint map, and based thereon:
  - determining an external value for at least one of the second model properties based at least in part on further data that is not provided in the first constraint map, the second constraint map, the expression, and the first model;
  - determining a second expression;
  - determining at least one second model value for at least one of the second model properties of the second model, based on the at least one first model value, the transformed expression, and the external value; and
  - causing the second modeling software component to update the at least one second model property in the second model to have the determined at least one second model value based on the at least one first model value, the transformed expression, and the external value.

13. The computer readable medium according to claim 12, wherein the method further comprises transforming the first expression into the second expression.

14. The computer readable medium according to claim 11, wherein the method further comprises:
- providing an output through a display device that prompts a user to provide an input through at least one input device that is usable for the at least one processor to determine at least one of the second properties that the user has selected to remain unchanged; and
- retrieving the external value for of the at least one of the second properties that the user has selected to remain unchanged from the second model by accessing the second modeling software component.

15. The computer readable medium according to claim 11, wherein the first model is a one dimensional (1D) simulation of a component, wherein the second model is a three dimensional (3D) computer-aided-design (CAD) model.

* * * * *